United States Patent
Dang et al.

(10) Patent No.: US 8,381,284 B2
(45) Date of Patent: Feb. 19, 2013

(54) SYSTEM AND METHOD FOR ENFORCING SECURITY POLICIES IN A VIRTUAL ENVIRONMENT

(75) Inventors: Amit Dang, Ghaziabad (IN); Preet Mohinder, New Delhi (IN)

(73) Assignee: McAfee, Inc., Santa Clara, CA (US)

( * ) Notice: Subject to any disclaimer, the term of this patent is extended or adjusted under 35 U.S.C. 154(b) by 475 days.

(21) Appl. No.: 12/545,609

(22) Filed: Aug. 21, 2009

(65) Prior Publication Data

US 2011/0047542 A1    Feb. 24, 2011

(51) Int. Cl.
    *G06F 21/00*    (2006.01)
(52) U.S. Cl. .................. 726/17; 718/1; 726/4; 726/16; 726/18; 726/21
(58) Field of Classification Search ........ 718/1; 726/17, 726/4, 16, 18, 21
    See application file for complete search history.

(56) References Cited

U.S. PATENT DOCUMENTS

| | | | |
|---|---|---|---|
| 4,688,169 A | 8/1987 | Joshi | |
| 4,982,430 A | 1/1991 | Frezza et al. | |
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,073,142 A | 6/2000 | Geiger et al. | |

(Continued)

FOREIGN PATENT DOCUMENTS

| EP | 1 482 394 A2 | 12/2004 |
|---|---|---|
| EP | 2 037 657 A1 | 3/2009 |

(Continued)

OTHER PUBLICATIONS

Espacenet search, Espacent Result List, Jan. 2012.*

(Continued)

*Primary Examiner* — Kaveh Abrishamkar
*Assistant Examiner* — Shan Elahi
(74) *Attorney, Agent, or Firm* — Patent Capital Group

(57) ABSTRACT

A method in one example implementation includes intercepting a request associated with an execution of an object (e.g., a kernel module or a binary) in a computer configured to operate in a virtual machine environment. The request is associated with a privileged domain of the computer that operates logically below one or more operating systems. The method also includes verifying an authorization of the object by computing a checksum for the object and comparing the checksum to a plurality of stored checksums in a memory element. The execution of the object is denied if it is not authorized. In other embodiments, the method can include evaluating a plurality of entries within the memory element of the computer, wherein the entries include authorized binaries and kernel modules. In other embodiments, the method can include intercepting an attempt from a remote computer to execute code from a previously authorized binary.

20 Claims, 4 Drawing Sheets

U.S. PATENT DOCUMENTS

| | | | |
|---|---|---|---|
| 6,141,698 A | 10/2000 | Krishnan et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | |
| 6,338,149 B1 | 1/2002 | Ciccone, Jr. et al. | |
| 6,356,957 B2 | 3/2002 | Sanchez, II et al. | |
| 6,393,465 B2 | 5/2002 | Leeds | |
| 6,442,686 B1 | 8/2002 | McArdle et al. | |
| 6,449,040 B1 | 9/2002 | Fujita | |
| 6,453,468 B1 | 9/2002 | D'Souza | |
| 6,460,050 B1 | 10/2002 | Pace et al. | |
| 6,587,877 B1 | 7/2003 | Douglis et al. | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | |
| 6,795,966 B1 | 9/2004 | Lim et al. | |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | |
| 6,934,755 B1 | 8/2005 | Saulpaugh et al. | |
| 6,988,101 B2 | 1/2006 | Ham et al. | |
| 6,988,124 B2 | 1/2006 | Douceur et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,065,767 B2 | 6/2006 | Kambhammettu et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,124,409 B2 | 10/2006 | Davis et al. | |
| 7,139,916 B2 | 11/2006 | Billingsley et al. | |
| 7,152,148 B2 | 12/2006 | Williams et al. | |
| 7,159,036 B2 | 1/2007 | Hinchliffe et al. | |
| 7,177,267 B2 | 2/2007 | Oliver et al. | |
| 7,203,864 B2 | 4/2007 | Goin et al. | |
| 7,251,655 B2 | 7/2007 | Kaler et al. | |
| 7,290,266 B2 | 10/2007 | Gladstone et al. | |
| 7,302,558 B2 | 11/2007 | Campbell et al. | |
| 7,330,849 B2 | 2/2008 | Gerasoulis et al. | |
| 7,346,781 B2 | 3/2008 | Cowle et al. | |
| 7,350,204 B2 | 3/2008 | Lambert et al. | |
| 7,353,501 B2 | 4/2008 | Tang et al. | |
| 7,363,022 B2 | 4/2008 | Whelan et al. | |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,546,333 B2 | 6/2009 | Alon et al. | |
| 7,607,170 B2 | 10/2009 | Chesla | |
| 7,657,599 B2 | 2/2010 | Smith | |
| 7,685,635 B2 * | 3/2010 | Vega et al. | 726/17 |
| 7,698,744 B2 | 4/2010 | Fanton et al. | |
| 7,757,269 B1 | 7/2010 | Roy-Chowdhury et al. | |
| 7,809,704 B2 | 10/2010 | Surendran et al. | |
| 7,836,504 B2 | 11/2010 | Ray et al. | |
| 7,908,653 B2 | 3/2011 | Brickell et al. | |
| 7,937,455 B2 | 5/2011 | Saha et al. | |
| 8,015,563 B2 | 9/2011 | Araujo et al. | |
| 2002/0069367 A1 | 6/2002 | Tindal et al. | |
| 2002/0083175 A1 | 6/2002 | Afek et al. | |
| 2002/0099671 A1 | 7/2002 | Mastin Crosbie et al. | |
| 2003/0014667 A1 | 1/2003 | Kolichtchak | |
| 2003/0023736 A1 | 1/2003 | Abkemeier | |
| 2003/0033510 A1 | 2/2003 | Dice | |
| 2003/0073894 A1 | 4/2003 | Chiang et al. | |
| 2003/0074552 A1 | 4/2003 | Olkin et al. | |
| 2003/0120601 A1 | 6/2003 | Ouye et al. | |
| 2003/0120811 A1 | 6/2003 | Hanson et al. | |
| 2003/0120935 A1 | 6/2003 | Teal et al. | |
| 2003/0145232 A1 | 7/2003 | Poletto et al. | |
| 2003/0163718 A1 | 8/2003 | Johnson et al. | |
| 2003/0167399 A1 | 9/2003 | Audebert et al. | |
| 2004/0003258 A1 | 1/2004 | Billingsley et al. | |
| 2004/0015554 A1 | 1/2004 | Wilson | |
| 2004/0051736 A1 | 3/2004 | Daniell | |
| 2004/0054928 A1 | 3/2004 | Hall | |
| 2004/0143749 A1 | 7/2004 | Tajalli et al. | |
| 2004/0167906 A1 | 8/2004 | Smith et al. | |
| 2004/0230963 A1 | 11/2004 | Rothman et al. | |
| 2004/0243678 A1 | 12/2004 | Smith et al. | |
| 2004/0255161 A1 | 12/2004 | Cavanaugh | |
| 2005/0018651 A1 | 1/2005 | Yan et al. | |
| 2005/0108516 A1 | 5/2005 | Balzer et al. | |
| 2005/0108562 A1 | 5/2005 | Khazan et al. | |
| 2005/0114672 A1 | 5/2005 | Duncan et al. | |
| 2005/0228990 A1 | 10/2005 | Kato et al. | |
| 2005/0235360 A1 | 10/2005 | Pearson | |
| 2005/0257207 A1 | 11/2005 | Blumfield et al. | |
| 2005/0260996 A1 | 11/2005 | Groenendaal | |
| 2005/0262558 A1 | 11/2005 | Usov | |
| 2005/0273858 A1 | 12/2005 | Zadok et al. | |
| 2005/0283823 A1 | 12/2005 | Okajo et al. | |
| 2006/0004875 A1 | 1/2006 | Baron et al. | |
| 2006/0015501 A1 | 1/2006 | Sanamrad et al. | |
| 2006/0037016 A1 | 2/2006 | Saha et al. | |
| 2006/0080656 A1 | 4/2006 | Cain et al. | |
| 2006/0085785 A1 | 4/2006 | Garrett | |
| 2006/0101277 A1 | 5/2006 | Meenan et al. | |
| 2006/0133223 A1 | 6/2006 | Nakamura et al. | |
| 2006/0136910 A1 | 6/2006 | Brickell et al. | |
| 2006/0136911 A1 | 6/2006 | Robinson et al. | |
| 2006/0195906 A1 | 8/2006 | Jin et al. | |
| 2006/0236398 A1 | 10/2006 | Trakic et al. | |
| 2007/0011746 A1 | 1/2007 | Malpani et al. | |
| 2007/0039049 A1 | 2/2007 | Kupferman et al. | |
| 2007/0050764 A1 * | 3/2007 | Traut | 718/1 |
| 2007/0074199 A1 * | 3/2007 | Schoenberg | 717/168 |
| 2007/0083522 A1 | 4/2007 | Nord et al. | |
| 2007/0101435 A1 | 5/2007 | Konanka et al. | |
| 2007/0136579 A1 | 6/2007 | Levy et al. | |
| 2007/0169079 A1 | 7/2007 | Keller et al. | |
| 2007/0192329 A1 * | 8/2007 | Croft et al. | 707/10 |
| 2007/0220061 A1 | 9/2007 | Tirosh et al. | |
| 2007/0253430 A1 | 11/2007 | Minami et al. | |
| 2007/0271561 A1 | 11/2007 | Winner et al. | |
| 2008/0005737 A1 | 1/2008 | Saha et al. | |
| 2008/0005798 A1 * | 1/2008 | Ross | 726/26 |
| 2008/0010304 A1 | 1/2008 | Vempala et al. | |
| 2008/0034416 A1 | 2/2008 | Kumar et al. | |
| 2008/0052468 A1 | 2/2008 | Speirs et al. | |
| 2008/0082977 A1 | 4/2008 | Araujo et al. | |
| 2008/0120499 A1 * | 5/2008 | Zimmer et al. | 713/2 |
| 2008/0163207 A1 * | 7/2008 | Reumann et al. | 718/1 |
| 2008/0163210 A1 | 7/2008 | Bowman et al. | |
| 2008/0184373 A1 * | 7/2008 | Traut et al. | 726/26 |
| 2008/0294703 A1 | 11/2008 | Craft et al. | |
| 2008/0301770 A1 | 12/2008 | Kinder | |
| 2009/0038017 A1 | 2/2009 | Durham et al. | |
| 2009/0043993 A1 | 2/2009 | Ford et al. | |
| 2009/0144300 A1 | 6/2009 | Chatley et al. | |
| 2009/0150639 A1 | 6/2009 | Ohata | |
| 2010/0071035 A1 | 3/2010 | Budko et al. | |
| 2010/0100970 A1 | 4/2010 | Chowdhury et al. | |
| 2010/0114825 A1 | 5/2010 | Siddegowda | |
| 2010/0281133 A1 | 11/2010 | Brendel | |
| 2010/0293225 A1 | 11/2010 | Sebes et al. | |
| 2011/0035423 A1 | 2/2011 | Kobayashi et al. | |
| 2011/0077948 A1 | 3/2011 | Sharma et al. | |
| 2011/0093842 A1 | 4/2011 | Sebes | |
| 2011/0093950 A1 | 4/2011 | Bhargava et al. | |
| 2011/0119760 A1 | 5/2011 | Sebes et al. | |
| 2011/0138461 A1 | 6/2011 | Bhargava et al. | |
| 2012/0030731 A1 | 2/2012 | Bhargava et al. | |
| 2012/0030750 A1 | 2/2012 | Bhargava et al. | |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |

| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

OTHER PUBLICATIONS

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+Architecture_Q1+2008.pdf, printed Aug. 18, 2009 (9 pages).

Kurt Gutzmann, "Access Control and Session Management in the HTTP Environment," Jan./Feb. 2001, pp. 26-35, IEEE Internet Computing.

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Lanugage Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,745, entitled "System and Method for Providing Address Protection in a Virtual Environment," filed Aug. 21, 2009, Inventor(s): Preet Mohinder.

U.S. Appl. No. 12/551,673, entitled "Piracy Prevention Using Unique Module Translation," filed Sep. 1, 2009, Inventor(s): E. John Sebes et al.

Barrantes et al., "Randomized Instruction Set Emulation to Dispurt Binary Code Injection Attacks," Oct. 27-31, 2003, ACM, pp. 281-289.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Gaurav et al., "Countering Code-Injection Attacks with Instruction-Set Randomization," Oct. 27-31, 2003, ACM, pp. 272-280.

IA-32 Intel® Architecture Software Developer's Manual, vol. 3B; Jun. 2006; pp. 13, 15, 22 and 145-146.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

U.S. Appl. No. 12/880,125, entitled "System and Method for Clustering Host Inventories," filed Sep. 12, 2010, Inventor(s) Rishi Bhargava, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/946,344, entitled "Method and System for Containment of Usage of Language Interfaces," filed Nov. 15, 2010, Inventor(s) Rosen Sharma, et al.

U.S. Appl. No. 13/012,138, entitled "System and Method for Selectively Grouping and Managing Program Files," filed Jan. 24, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

Notification of International Preliminary Report on Patentability and Written Opinion mailed May 24, 2012 for International Application No. PCT/US2010/055520, 5 pages.

Sailer et al., sHype: Secure Hypervisor Approach to Trusted Virtualized Systems, IBM research Report, Feb. 2, 2005, 13 pages.

U.S. Appl. No. 13/558,181, entitled "Method and Apparatus for Process Enforced Configuration Management," filed Jul. 25, 2012, Inventor(s) Rishi Bhargava et al.

U.S. Appl. No. 13/558,227, entitled "Method and Apparatus for Process Enforced Configuration Management," filed Jul. 25, 2012, Inventor(s) Rishi Bhargava et al.

U.S. Appl. No. 13/558,277, entitled "Method and Apparatus for Process Enforced Configuration Management," filed Jul. 25, 2012, Inventor(s) Rishi Bhargava et al.

* cited by examiner

SYSTEM AND METHOD FOR ENFORCING SECURITY POLICIES IN A VIRTUAL ENVIRONMENT

TECHNICAL FIELD

This disclosure relates in general to the field of security and, more particularly, to enforcing security policies in a virtual environment.

BACKGROUND

The field of network security has become increasingly important in today's society. In particular, the ability to effectively protect computers and systems presents a significant obstacle for component manufacturers, system designers, and network operators. This obstacle is made even more difficult due to the plethora of new security threats, which seem to evolve daily. Virtualization is a software technology allowing an operating system to run unmodified on an isolated virtual environment (typically referred to as a virtual machine), where a platform's physical characteristics and behaviors are reproduced. More specifically, a virtual machine can represent an isolated, virtual environment (lying on top of a host operating system (OS)) and equipped with virtual hardware (processor, memory, disks, network interfaces, etc.). Commonly, the virtual machine is managed by a virtualization product. A virtual machine monitor (VMM) is the virtualization software layer that manages hardware requests from a guest OS (e.g., simulating answers from real hardware). A hypervisor is computer software/hardware platform virtualization software that allows multiple operating systems to run on a host computer concurrently. Both Xen and Hypervisor represent forms of VMMs and these VMMs can be exploited to better protect computers and systems from emerging security threats.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes intercepting a request associated with an execution of an object (e.g., a kernel module or a binary) in a computer configured to operate in a virtual machine environment. The request for the execution is associated with a privileged domain of the computer that operates logically below one or more operating systems. The method also includes verifying an authorization of the object by computing a checksum for the object and comparing the checksum to a plurality of stored checksums in a memory element. The method further includes denying the execution of the object if it is not authorized. In other embodiments, the method can include evaluating a plurality of entries within the memory element of the computer, wherein the entries include authorized binaries and kernel modules. In other embodiments, the method can include intercepting an attempt from a remote computer to execute code from a previously authorized binary, and evaluating an origination address of a hypercall associated with the code before executing the code.

Example Embodiments

Figure 1:
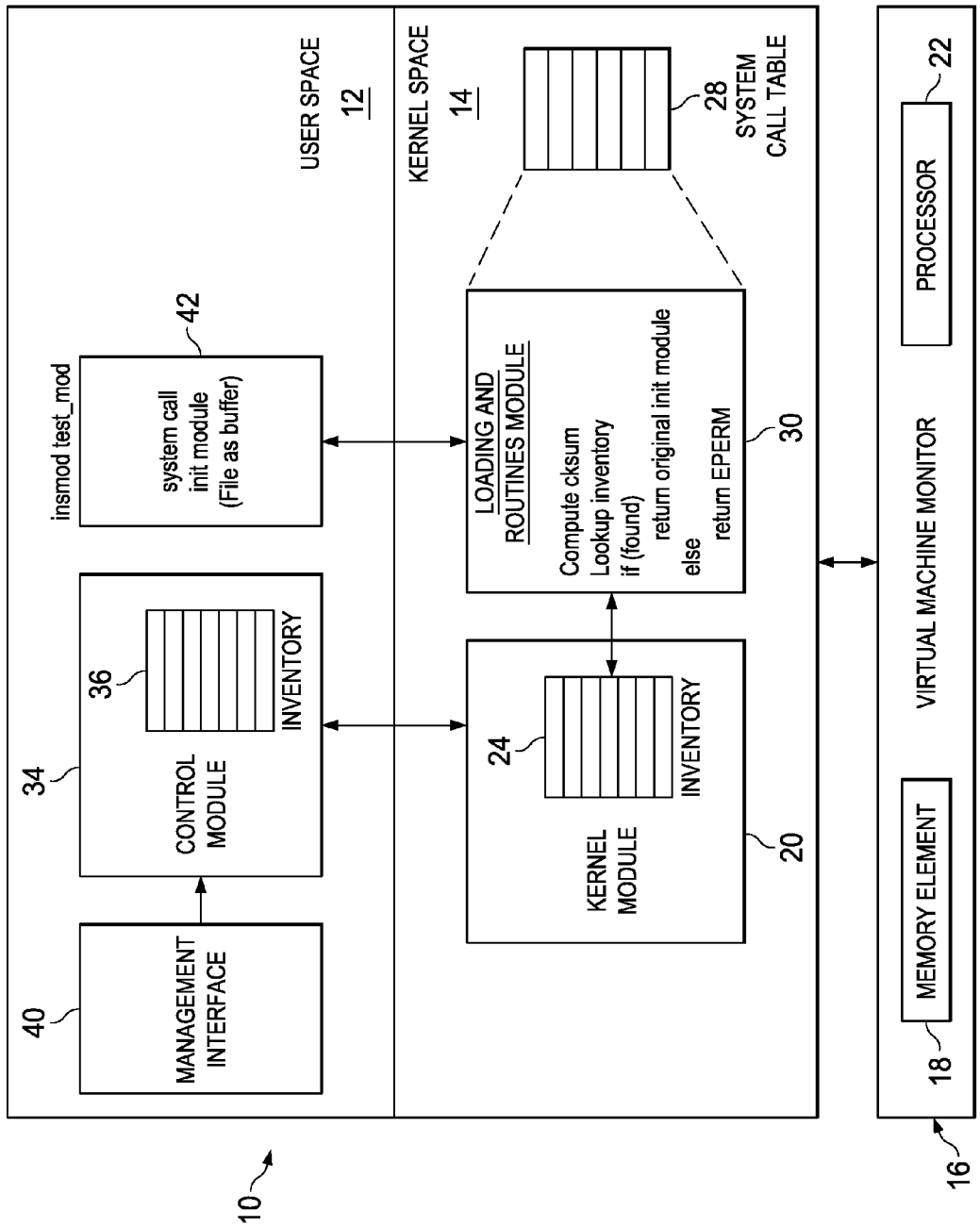
FIG. 1 is a simplified block diagram of a system for enforcing security policies in a privileged domain of a virtual environment in accordance with one embodiment.

FIG. 1 is a simplified block diagram of a system 10 for enforcing security policies in a privileged domain of a virtual environment. Such an architecture can provide a secure environment for the execution of operations in the privileged domain, as well as in other guest operating systems. In one example implementation, FIG. 1 includes a user space 12, a kernel space 14, a virtual machine monitor 16, and a kernel module 20, which includes an inventory 24. Virtual machine monitor 16 may include a memory element 18 and a processor 22 in one example implementation. In addition, FIG. 1 may include a system call table 28, a management interface 40, and a control module 34, which includes an inventory 36. A system call 42 is also provided, and this element interfaces with a loading and routines element 30, which interacts with inventory 24. Not shown in FIG. 1 is additional hardware that may be suitably coupled to virtual machine monitor (VMM) 16 (e.g., provided below its logical representation) in the form of memory management units (MMU), symmetric multiprocessing (SMP) elements, physical memory, Ethernet, small computer system interface (SCSI)/integrated drive electronics (IDE) elements, etc.

For purposes of illustrating the techniques of system 10, it is important to understand the activities occurring within a given virtual system. The following foundational information may be viewed as a basis from which the present disclosure may be properly explained. Such information is offered earnestly for purposes of explanation only and, accordingly, should not be construed in any way to limit the broad scope of the present disclosure and its potential applications. Virtual machine monitors (e.g., Xen and HyperV) are hypervisors that currently fail to offer an interface to the end user to properly manage virtual machines and guest operating system (OS) instances. As used herein in this Specification, the term 'virtual machine element' is meant to include any such hypervisors, or other devices that operate in a virtual environment. It should also be noted that these hypervisor's fail to offer suitable device drivers. Both of the above functionalities are commonly provided by a special privileged domain/partition. Generally, these privileged domains can host device drivers and, further, provide an interface for managing virtual machine monitor 16 and guest OS instances.

Any grant of special privileges to a particular domain poses security risks for other guest OS instances. A compromised privileged domain can readily degrade the security of all guest OS instances running on a computer. In essence, hypervisors and privileged domains can unknowingly engender new attack vectors that are not adequately protected by current security solutions. System 10 offers a viable architecture to thwart these new categories of attacks, as well as other security risks presented to a given computer.

Consider a first example in which some type of malware is attempting to run a kernel module, which is not authorized. A hypercall is a function that is generally used by a kernel module to interact with a virtual machine. For example, a hypercall could be used by the kernel module to access specific areas of a given machine. The hypercall can shut down the virtual machine and, in a worst-case scenario, control all the other virtual machines to which it can communicate. Thus, the ability of certain code (e.g., in the form of a hypercall) to enter a certain space and to improperly manipulate the system is problematic.

The primary attack vectors that can compromise a privileged domain include: 1) execution of an unauthorized user binary (malware/virus)/kernel module; 2) execution of a vulnerable authorized binary; and 3) execution of unauthorized hypercalls. System 10 can be used to enforce security policies in the privileged domain. The present disclosure is directed towards securing privileged domains/partitions. In certain embodiments, the current disclosure works by inserting a security layer in the Domain 0 kernel, which protects: 1) against execution of unauthorized user space binaries/kernel module; and 2) against execution of vulnerable authorized binary.

The system can be configured to take a snapshot of all the valid binaries and kernel modules and store the information in a user space database/inventory. The kernel security layer (in Domain 0) can intercept a kernel module and binary load routine and, subsequently, fetch inventory data from the user space inventory. When a particular request for execution of a kernel module or of a binary occurs, an intercept function is invoked that checks for an authorization of the loaded module or binary. The intercepting function allows execution of only authorized binaries/modules. Note that in computing, an executable (file) causes a computer to perform indicated tasks according to encoded instructions, as opposed to a file that only contains data. Files that contain instructions for an interpreter or virtual machine may be considered 'executables' or 'binaries' in contrast to program source code. The more generic term 'object' (as used herein in this Specification) is meant to include any such executables, binaries, kernel modules, improper hypercalls, etc., which are sought to be invoked, initiated, or otherwise executed.

The current disclosure also protects against execution of unauthorized hypercalls if a currently running binary is exploited. This is important because an attacker could use hypercalls to take over the entire virtual infrastructure. In such an implementation, the security layer checks for an origination address of hypercalls. The security layer can randomize hypercalls such that only authorized binaries can invoke the appropriate hypercalls.

Note that no security solution exists that effectively protects the privileged domain (Domain 0) as a special entity. Common solutions to the issues detailed herein include security software that would normally run on a commodity operating system. Security of privileged domains is an area of active research; however, there is no solution available that proactively protects the critical domains. System 10, by contrast, can treat the privileged domain as special and protect it against the new attack vectors involved. This is in contrast to more generalized solutions, which do not specifically target protection for Domain 0.

Turning to the infrastructure of FIG. 1, virtual machine monitor 16 can run multiple instances of guest OSs. Logically, this element can be thought of as the hypervisor in certain implementations. Virtual machine monitor 16 can be part of a server, a firewall, an antivirus solution, or more generically, a computer. Kernel space 14 of the virtual machine is the area where a security layer can be inserted. In this particular case, kernel space 14 is associated with Domain 0. An operating system usually segregates virtual memory into kernel space and user space. Kernel space is commonly reserved for running a kernel, the kernel extensions, and certain device drivers. In contrast, user space is the memory area where user mode applications work and this memory can be swapped out (if necessary).

Each user space process normally runs in its own virtual memory space and, unless explicitly requested, does not access the memory of other processes. This is the basis for memory protection in mainstream operating systems, and a building block for privilege separation. In another approach, a single address space for all software is used, where the programming language's virtual machine ensures that arbitrary memory cannot be accessed. Applications simply cannot acquire references to the objects that they are not allowed to access.

Kernel module 20 represents the security layer in the Domain 0 kernel, which provides protection to the domain against unauthorized (and vulnerable authorized) binaries and kernel modules. In some attack scenarios, this can be the source of hypercalls. A hypercall is a software trap from a domain (e.g., Domain 0) to the hypervisor, just as a syscall is a software trap from an application to the kernel. Domains can use hypercalls to request privileged operations like updating page tables. Like a syscall, the hypercall is synchronous, where the return path from the hypervisor to the domain can employ event channels.

In one example implementation, virtual machine monitor 16 is a Xen element, which is a hypervisor that runs on bare hardware and which provides the capability of running multiple instances of OSs simultaneously on the same hardware. A typical Xen setup may involve Xen running beneath multiple OSs, where applications are on top of the OSs, which are associated with a group of virtual machines. The entire configuration may be provided in a server (or some other network appliance). One of the virtual machines can be running an OS associated with Domain 0. This VM (Dom 0) provides the user with the interface to manage this complete setup, and also hosts the device drivers. This management includes the hypervisor configuration, VM configuration, creation, deletion, shutdown, startup, etc. of VMs. This kind of setup can be popular in data centers where servers run Xen, which in turn hosts multiple instances of guest OSs (VMs). Each such server can have one Domain 0. The features discussed herein can effectively secure this Domain 0, as detailed below.

In most virtualization scenarios, one of the virtual elements is referred to as Domain 0, and it has administrative authority to control other virtual machines. This domain represents a privileged area and, therefore, it should be protected. In one example implementation, virtual machine monitor 16 is a Xen element configured to carry out some of the protection operations as outlined herein. Note that this Xen implementation is only representing one possible example to which the present disclosure can apply. Any number of additional hypervisors or virtual elements could similarly benefit from the broad teachings discussed herein.

In one example, a hypervisor can offer tools and applications necessary to support a complete virtualization environment. The hypervisor is the basic abstraction layer of software that sits directly on the hardware below operating systems. It is responsible for central processing unit (CPU) scheduling and memory partitioning of the various virtual machines running on a hardware device. The hypervisor not only abstracts the hardware for the virtual machines, but also controls the execution of virtual machines as they share the common processing environment.

Inventory 24 represents a memory element (e.g., a database) that may be provided in a security layer that keeps information about authorized binaries and kernel modules. System call table 28 is configured to intercept loading of modules and binaries in a given computer. Loading routines module 30 provides functionality for hooked routines, which can perform a check on each kernel module and binary. Control module 34 offers control for the security layer in user space 12. Control module 34 may include inventory 36, which represents user space inventory that gets pushed to the kernel security layer. Both instances of inventory 24 and 36 may be updated, and/or suitably modified based on systematic configurations, or events that trigger a change to either of these inventories. Management interface 40 can be configured to control the behavior of a security agent, which is relegated the task of protecting a computer.

In operation of a simple example, a loadable kernel module (LKM) represents a system commonly used by Linux (as well as some other modern operating systems) to allow the linking of object code into a running kernel without interrupting system traffic. At a fundamental level, an object is compiled to a re-locatable object (.o) file, loaded using 'insmod' under Linux, and removed using 'rmmod'. Linux also supports demand loading of modules using 'kerneld' (now kmod).

Once 'insmod' is called, the module is linked into the running system kernel and the function init_module ( ) is called. All modules should contain this function, as well as a cleanup_module ( ), which is called at unloading. The purpose of the init_module ( ) is to register the functions contained within the module to handle system events, such as to operate as device drivers or interrupt handlers. The actions performed by insmod are similar to that of 'ld', for example, in regards to linkage.

In this example, when a request to run a binary or kernel module is intercepted, it is checked to see whether it is authorized. For example, a security agent (e.g., a piece of software running in Domain 0) can be configured to compute checksums in order to validate whether a given element (i.e., a binary or a kernel module) is authorized for the particular system. This may include look up operations in which stored inventories are compared against a new request for binaries or kernel modules in order to discern whether to allow these elements to be executed. Thus, the comparison is being made against internally stored items.

The interaction in the architecture of FIG. 1 occurs between system call 42 and loading routines module 30, where a checksum is computed and looked up in an associated inventory. If the checksum is found, then the request is authorized (e.g., 'return original init [initiate] module'), but if the request is not authorized, then an 'EPERM' command is sent, which indicates that the operation is not permitted. More detailed operations associated with these activities are provided below with reference to specific example flows.

Figure 2:
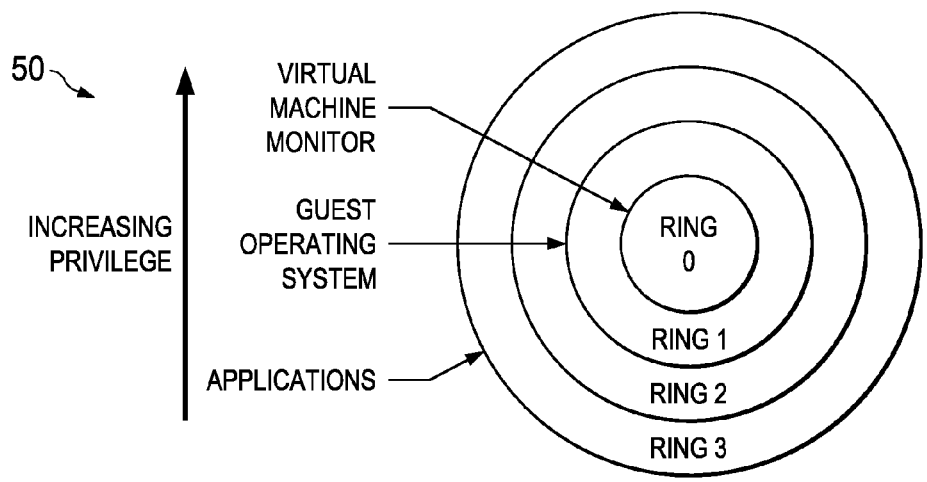
FIG. 2 is a simplified view of processor privilege level ring usage in accordance with one embodiment.

Turning to FIG. 2, FIG. 2 is a simplified schematic diagram illustrating a hierarchy 50 of domains within a given computer. More specifically, FIG. 2 depicts a processor privilege level ring usage (x86) in accordance with one embodiment. This ring usage can be associated with a para virtualized system, where a Xen VMM runs in Ring 0, Domain 0, and other guest OS kernels run in Ring 1 and Domain 0 (and additional guest OS user space applications can run in Ring 3). Note that the Rings correspond to specific domains in this illustration such that the most privileged domain is represented By Ring 0 (i.e., Domain 0). This is associated with virtual machine monitor 16, where a guest operating system corresponds to Ring 1, and applications correspond to Ring 2 and/or Ring 3. It should also be noted that hypercalls could easily jump to virtual machine monitor 16, or Ring 0, which is problematic for the reasons discussed herein.

Domain 0, a modified Linux kernel, is a unique virtual machine running on the hypervisor that has special rights to access physical I/O resources, as well as interact with the other virtual machines (Domain U: PV and HVM Guests) running on the system. Domain 0 is the first domain launched when the system is booted, and it can be used to create and configure all other regular guest domains. Domain 0 is also sometimes called Dom0 and, similarly, a regular guest domain is called a DomU or unprivileged domain. Virtualization environments can require Domain 0 to be running before other virtual machines can be started. Two drivers are generally included in Domain 0 to support network and local disk requests from Domain U PV and HVM Guests: the Network Backend Driver and the Block Backend Driver. The Network Backend Driver communicates directly with the local networking hardware to process all virtual machines requests coming from the Domain U guests. The Block Backend Driver communicates with the local storage disk to read and write data from the drive based upon Domain U requests.

Thus, a given hypervisor is not alone in its task of administering the guest domains on the system. A special privileged domain (Domain 0) serves as an administrative interface to Xen. Domain 0 has direct physical access to hardware, and it exports the simplified generic class devices to each DomU. Rather than emulating the actual physical devices exactly, the hypervisor exposes idealized devices. For example, the guest domain views the network card as a generic network class device or the disk as a generic block class device. Domain 0 runs a device driver specific to each actual physical device and then communicates with other guest domains through an asynchronous shared memory transport.

Domain 0 can also delegate responsibility for a particular device to another domain. A driver domain is a DomU that runs a minimal kernel and the backend for a particular device. This has the advantage of moving the complexity and risk of device management out of the Domain 0. Moving device management to driver domains can make the system more stable because hardware drivers are notoriously the most error-prone code in an operating system. A driver domain could be stopped and restarted to recover from an error, while stopping and restarting Domain 0 can disrupt the entire system.

As a general proposition, a smaller and simpler Domain 0 is better for the security and stability of the system. Moving device management into driver domains is just one example of this. Although Domain 0 typically runs a general-purpose operating system, it is wise to use Domain 0 strictly for the administration of virtual machines on the system. All other applications can be run in a guest domain. Overall, a barebones Domain 0 is less vulnerable to attack or accidental software fault.

Figure 3:
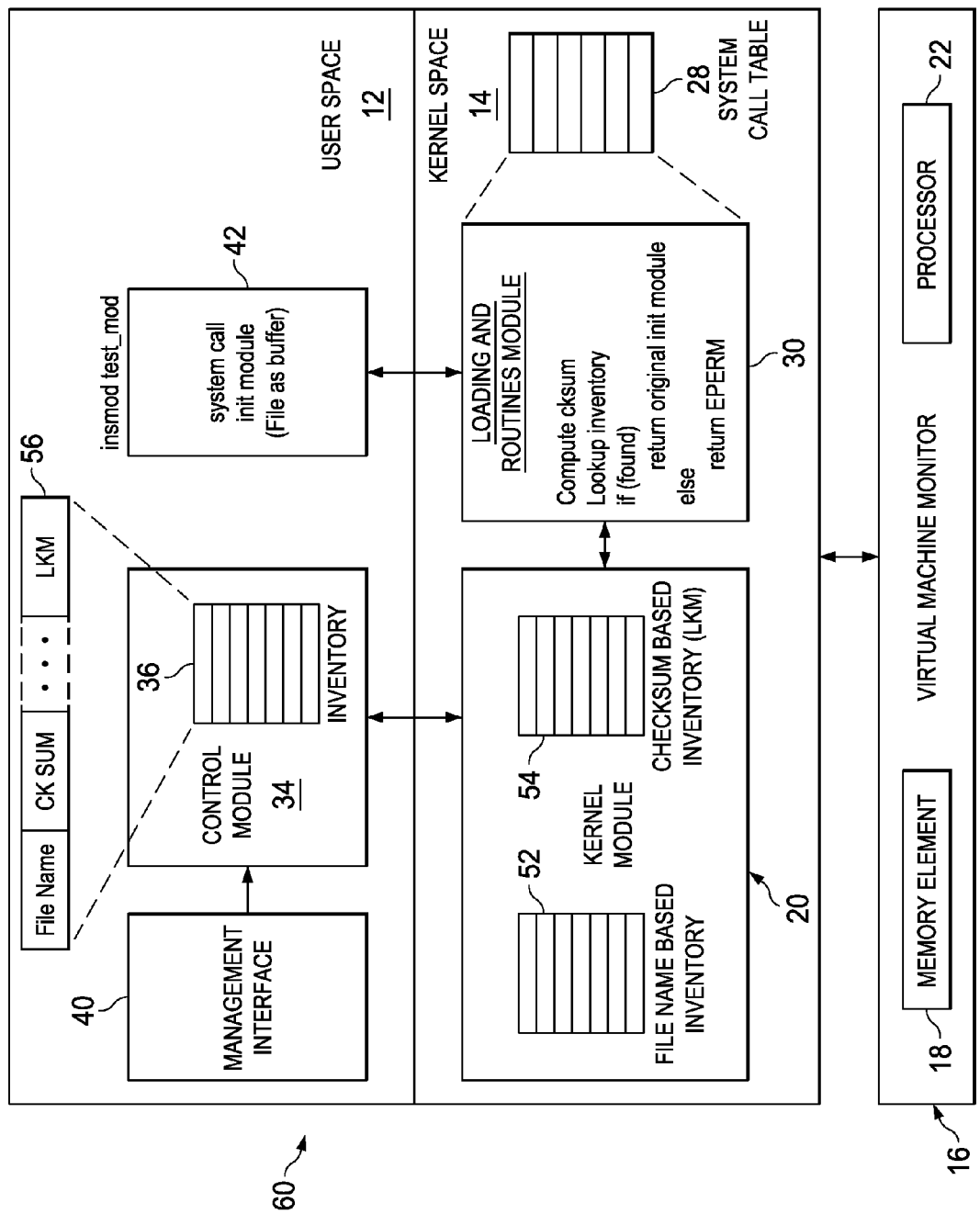
FIG. 3 is a simplified block diagram of a system for enforcing security policies in a privileged domain of a virtual environment in accordance with another embodiment.

FIG. 3 is a simplified block diagram of an LKM authentication implementation 60 in accordance with one example of the present disclosure. FIG. 3 includes many of the same components as FIG. 1, with the addition of a filename based inventory 52 and a checksum based inventory (LKM) 54. In addition, a logical representation of an inventory entry 56 is depicted. Inventory entry 56 includes various fields including a filename, a checksum, an LKM, etc.

As discussed above, there are several Domain 0 security issues in such a scenario. These include unauthorized binary execution, or the propagation of malware capable of modifying the VM state (e.g., via ioctl). Another security risk is presented by the remote code injection in authorized binary to modify the VM state (e.g., via ioctl). Note that in computing, an ioctl is typically the part of the user-to-kernel interface of an operating system. The acronym is short for "Input/output control," where ioctls are commonly employed to allow user space code to communicate with hardware devices or kernel components. The other threat in such a scenario involves an unauthorized Linux kernel module (e.g., a hypercall). The architecture of FIG. 3 may operate to protect Domain 0 in the following ways. First, the architecture can prevent any execution of unauthorized binaries. Second, the architecture can prevent an ioctl from a writable memory area (e.g., in the context of a buffer overflow attack). In addition, the architecture can protect the system by allowing only authorized LKMs to load.

Figure 4:
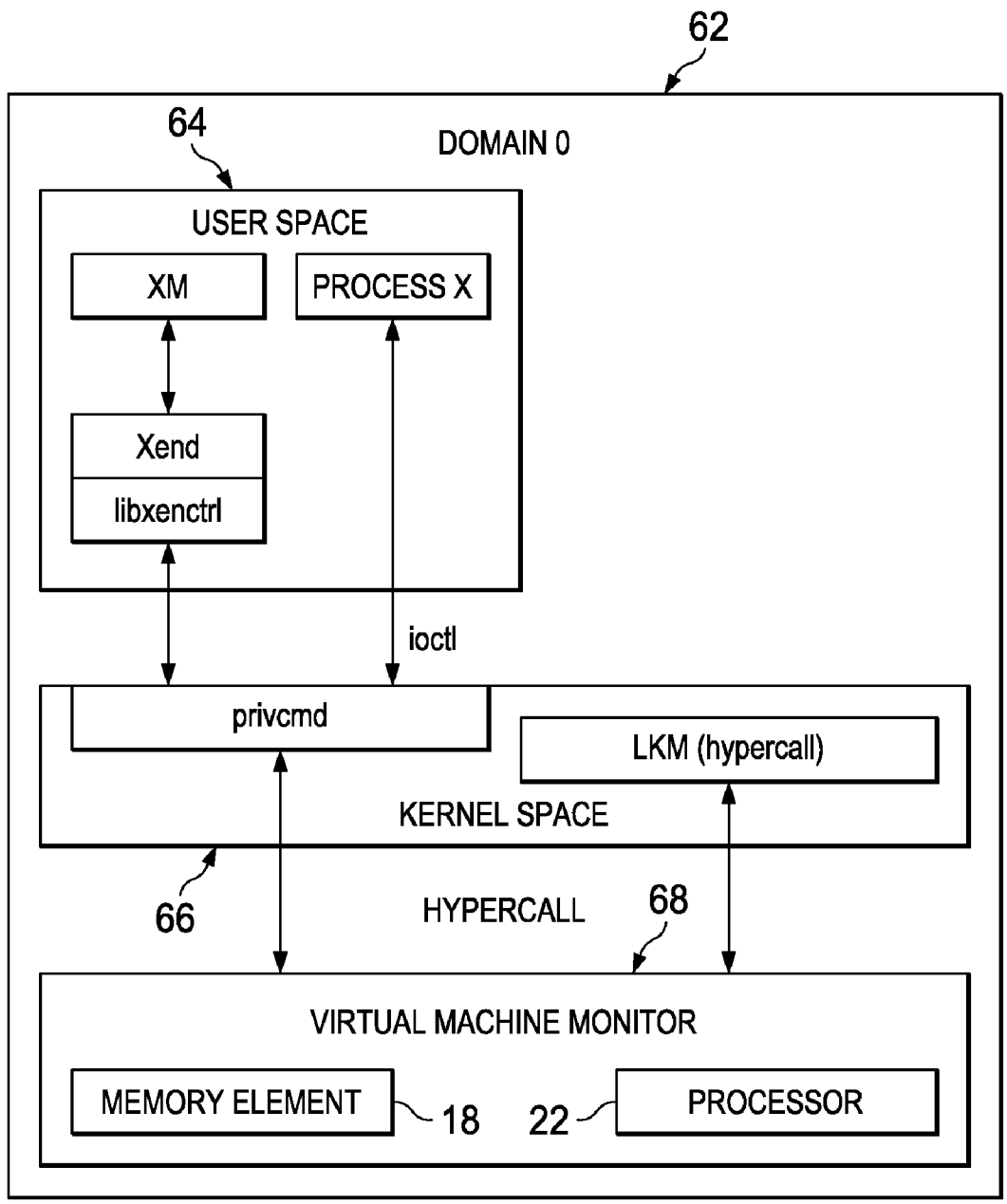
FIG. 4 is a simplified block diagram providing an overview of components and processes in Domain 0 and, further, their interactions with a virtual machine monitor in accordance with another embodiment.

FIG. 4 is a simplified block diagram of an exploit prevention implementation 62 in accordance with one example of the present disclosure. FIG. 4 depicts an overview of components and processes in Domain 0 and, further, their interactions with a virtual machine monitor (e.g., a Xen VMM). The architecture of FIG. 4 includes a user space 64, a kernel space 66, and a virtual machine monitor 68. The operations of this particular architecture are akin to those outlined herein in protecting an associated system from unauthorized kernel modules or binaries being run, for example, through malware.

Xend shown in FIG. 4 is a special process (e.g., a daemon) that runs as root in Domain 0. It is a part of the Xen system, where users typically interface with xend via the Xen Management (xm) commands. Xm commands to start, stop, and manage guest domains send requests to the xend daemon first, which are in turn relayed to the Xen hypervisor via a hypercall. Commonly, the xend daemon listens for requests on an open network port. The xm commands typically send requests to the listening xend daemon on the same machine. Xm is in the user interface and xend handles the validation and sequencing of requests from multiple sources. The Xen hypervisor carries out the request in most implementations. In this example, an ioctl system call is intercepted and evaluated. If the EIP address is from a writable region, the system call is failed and not performed.

Software for intercepting unauthorized binaries and kernel modules (as well as inhibiting dangerous code from being executed for already running binaries) can be provided at various locations. In one example implementation, this software is resident in a computer sought to be protected from a security attack (or protected from unwanted, or unauthorized manipulations of a privileged area). In a more detailed configuration, this software is specifically resident in Domain 0. One implementation involves providing in a security layer of a virtual machine monitor, which may include (or otherwise interface with) a kernel space and a user space, as depicted by FIG. 1.

In still other embodiments, software could be received or downloaded from a web server (e.g., in the context of purchasing individual end-user licenses for separate devices, separate virtual machines, hypervisors, servers, etc.) in order to carry out these intercepting and authorizing functions in Domain 0. In other examples, the intercepting and authorizing functions could involve a proprietary element (e.g., as part of an antivirus solution), which could be provided in (or be proximate to) these identified elements, or be provided in any other device, server, network appliance, console, firewall, switch, information technology (IT) device, etc., or be provided as a complementary solution (e.g., in conjunction with a firewall), or provisioned somewhere in the network. As used herein in this Specification, the term 'computer' is meant to encompass these possible elements (VMMs, hypervisors, Xen devices, virtual devices, network appliances, routers, switches, gateway, processors, servers, loadbalancers, firewalls, or any other suitable device, component, element, or object) operable to affect or process electronic information in a security environment. Moreover, this computer may include any suitable hardware, software, components, modules, interfaces, or objects that facilitate the operations thereof. This may be inclusive of appropriate algorithms and communication protocols that allow for the effective authorization of kernel modules, binaries, etc. In addition, the intercepting and authorizing functions can be consolidated in any suitable manner. Along similar design alternatives, any of the illustrated modules and components of FIGS. 1, 3, and 4 may be combined in various possible configurations: all of which are clearly within the broad scope of this Specification.

In certain example implementations, the intercepting and authorizing functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in the FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., a computer, a server, a network appliance, a firewall, a virtual machine element, etc.) can include memory elements for storing information to be used in achieving the intercepting and authorizing operations as outlined herein. Additionally, each of these devices may include a processor that can execute software or an algorithm to perform the intercepting and authorizing activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., inventory, table(s), user space, kernel space, etc.) should be construed as being encompassed within the broad term 'memory element.' Similarly, any of the potential processing elements, modules, and machines described in this Specification should be construed as being encompassed within the broad term 'processor.' Each of the computers, network appliances, virtual elements, etc. can also include suitable interfaces for receiving, transmitting, and/or otherwise communicating data or information in a secure environment.

Figure 5:
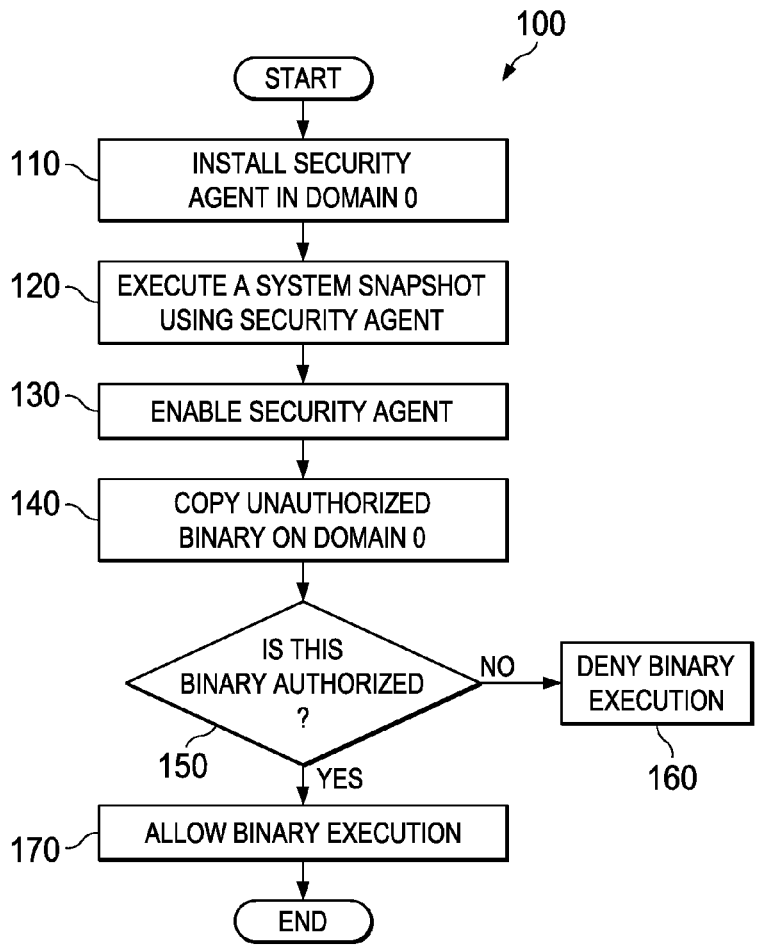
FIG. 5 is a simplified flowchart illustrating a series of example steps associated with the system in accordance with one embodiment.

FIG. 5 is a flowchart 100 illustrating how security agents can provide security to Domain 0 in accordance with one example embodiment. The flow begins at step 110, where a security agent is installed in Domain 0 of the virtual machine monitor. This initiates the security protection being provided for a given system. At step 120, a system snapshot is performed using the security agent. This could involve evaluating a number of entries in the system's inventory such that authorized elements (binaries, kernel modules, etc.) are identified for future reference. At step 130, the security agent is enabled and this could further involve one or more commands that initiate the protection mechanism.

Step 140 represents copying of an unauthorized binary on Domain 0. The security agent is configured to compute checksums in order to validate whether a given element (a binary or kernel module) is authorized for the particular system. These activities may include look up operations in which stored inventories are compared against new requests for binaries or kernel modules in order to discern whether to allow these elements to be executed. Thus, the comparison is being made against stored items.

At step 150, the query is answered as to whether this particular binary has been authorized. If it has not been authorized, the flow moves to step 160 where execution of the binary is denied. In such a context, an inference can be made that if the lookup reveals that the particular binary is not found, then the request is presumed to be a security risk that should not be executed. If the binary is authorized, then from step 150 the flow moves to step 170, where execution of the binary is allowed.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that system 10 of FIG. 1 (and its teachings) is readily scalable. System 10 can accommodate a large number of components, as well as more complicated or sophisticated arrangements and configurations. Accordingly, the examples provided should not limit the scope or inhibit the broad teachings of system 10 as potentially applied to a myriad of other architectures. In addition, system 10 has been described herein as operating on particular Xen architectures; however, other systems can readily be accommodated by the present solution.

It is also important to note that the steps described with reference to the preceding FIGURES illustrate only some of the possible scenarios that may be executed by, or within, system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the discussed concepts.

What is claimed is:

1. A method, comprising:
inserting a security layer in a kernel of a privileged domain of a computer configured to operate in a virtual machine environment, wherein the privileged domain of the computer manages a virtual machine monitor (VMM) and operates logically below one or more guest operating systems;
storing a snapshot of authorized objects in a user space of the privileged domain;
intercepting, by the security layer, a request for an execution of an object in the computer wherein the request for the execution is from a user space of the privileged domain;
verifying an authorization of the object by linking a particular module into a kernel space associated with the privileged domain, wherein the particular module is configured to compute a checksum for the object, access an inventory of a plurality of stored checksums in a memory element, and compare the checksum to the plurality of stored checksums; and
denying the execution of the object if it is not authorized.

2. The method of claim 1, further comprising:
evaluating a plurality of entries within the memory element of the computer, wherein the entries include authorized binaries and kernel modules.

3. The method of claim 1, further comprising:
intercepting an attempt from a remote computer to execute code from a previously authorized binary; and
evaluating an origination address of a hypercall associated with the code before executing the code.

4. The method of claim 1, wherein the object is a kernel module or a binary.

5. The method of claim 1, wherein the verifying of the authorization of the object includes comparing the object to an inventory of authorized objects stored in a user space of the computer, and wherein a log is created if the execution of the object is not authorized.

6. The method of claim 1, further comprising:
allowing the object to be executed if its corresponding checksum is found as matching one of the plurality of stored checksums in the memory element.

7. The method of claim 1, wherein the object is a kernel module that is interacting with a hypercall, which attempts to access one or more privileged domain areas within the computer.

8. A logic encoded in one or more tangible non-transitory media that includes code for execution and when executed by a processor is operable to perform operations comprising:
inserting a security layer in a kernel of a privileged domain of a computer configured to operate in a virtual machine environment, wherein the privileged domain of the computer manages a virtual machine monitor (VMM) and operates logically below one or more guest operating systems;
storing a snapshot of authorized objects in a user space of the privileged domain;
intercepting, by the security layer, a request for an execution of an object in the computer wherein the request for the execution is from a user space of the privileged domain;
verifying an authorization of the object by linking a particular module into a kernel space associated with the privileged domain, wherein the particular module is configured to compute a checksum for the object, access an inventory of a plurality of stored checksums in a memory element, and compare the checksum to the plurality of stored checksums; and
denying the execution of the object if it is not authorized.

9. The logic of claim 8, the processor being operable to perform operations comprising:

evaluating a plurality of entries within the memory element of the computer, wherein the entries include authorized binaries and kernel modules.

10. The logic of claim 8, the processor being operable to perform operations comprising:
intercepting an attempt from a remote computer to execute code from a previously authorized binary; and
evaluating an origination address of a hypercall associated with the code before executing the code.

11. The logic of claim 8, wherein the object is a kernel module or a binary.

12. The logic of claim 8, wherein the object is a kernel module that is interacting with a hypercall, which attempts to access one or more privileged domain areas within the computer.

13. The logic of claim 8, wherein the verifying of the authorization of the object includes comparing the object to an inventory of authorized objects stored in a user space of the computer, and wherein a log is created if the execution of the object is not authorized.

14. The logic of claim 8, the processor being operable to perform operations comprising:
allowing the object to be executed if its corresponding checksum is found as matching one of the plurality of stored checksums in the memory element.

15. An apparatus, comprising:
a virtual machine element;
a memory element configured to store data; and
a processor operable to execute instructions associated with the data, wherein the virtual machine element is configured to:
insert a security layer in a kernel of a privileged domain of a computer configured to operate in a virtual machine environment, wherein the privileged domain of the computer manages a virtual machine monitor (VMM) and operates logically below one or more guest operating systems;
store a snapshot of authorized objects in a user space of the privileged domain;
intercept, by the security layer, a request for an execution of an object in the computer wherein the request for the execution is from a user space of the privileged domain;
verify an authorization of the object by linking a particular module into a kernel space associated with the privileged domain, wherein the particular module is configured to compute a checksum for the object, access an inventory of a plurality of stored checksums in a memory element, and compare the checksum to the plurality of stored checksums; and
deny the execution of the object if it is not authorized.

16. The apparatus of claim 15, wherein the virtual machine element is further configured to:
evaluate a plurality of entries within the memory element of the computer, wherein the entries include authorized binaries and kernel modules.

17. The apparatus of claim 15, wherein the virtual machine element is further configured to:
intercept an attempt from a remote computer to execute code from a previously authorized binary; and
evaluate an origination address of a hypercall associated with the code before executing the code.

18. The apparatus of claim 15, wherein the object is a kernel module or a binary.

19. The apparatus of claim 15, wherein the object is a kernel module that is interacting with a hypercall, which attempts to access one or more privileged domain areas within the computer.

20. The apparatus of claim 15, wherein the object is allowed to be executed if its corresponding checksum is found as matching one of the plurality of stored checksums in the memory element.

* * * * *